W. H. HARRIS.
PORTABLE TRUCK,
APPLICATION FILED JULY 30, 1909.
955,398.
Patented Apr. 19, 1910.
2 SHEETS—SHEET 1.
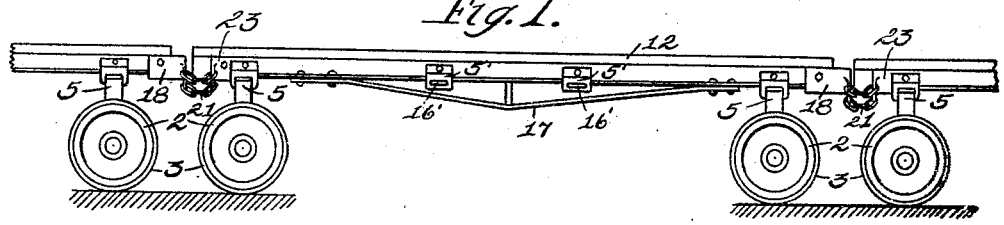
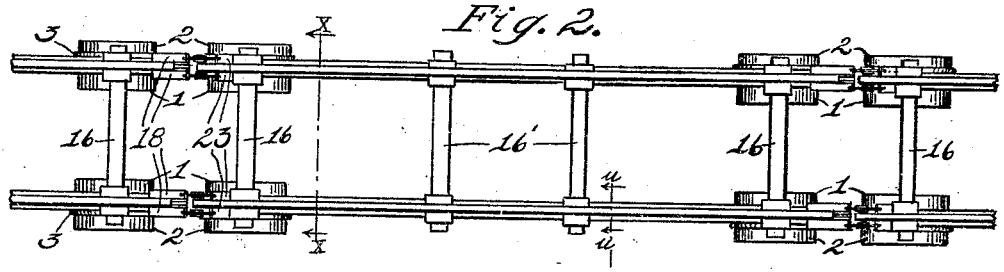
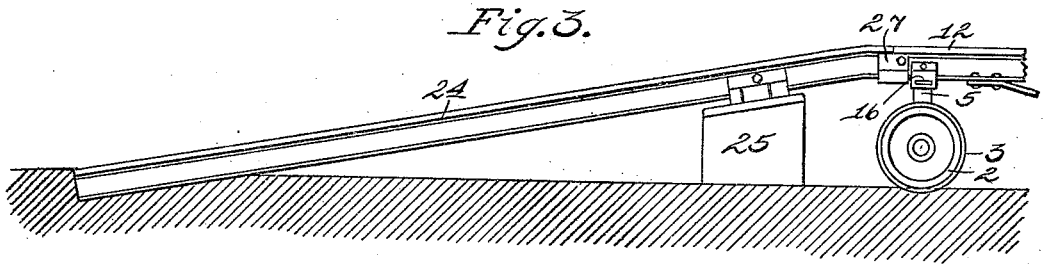
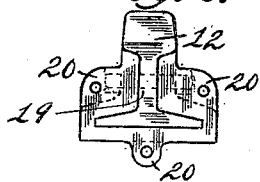
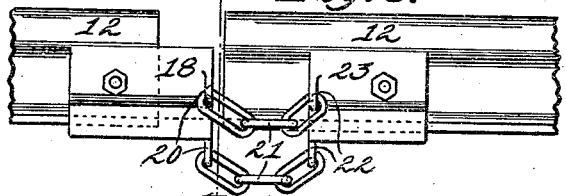
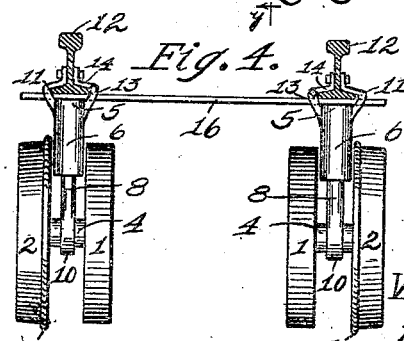
Witnesses:
C. E. Wessels.
B. G. Richards.
Inventor:
William H. Harris,
By Joshua R. H. Potts
His Attorney.

W. H. HARRIS.
PORTABLE TRUCK.
APPLICATION FILED JULY 30, 1909.

955,398.

Patented Apr. 19, 1910.

2 SHEETS—SHEET 2.

Witnesses:
C. E. Wessels.
B. G. Richards

Inventor:
William H. Harris,
By Joshua R. H. Potts
his Attorney.

UNITED STATES PATENT OFFICE.

WILLIAM H. HARRIS, OF GLADSTONE, TERRITORY OF NEW MEXICO.

PORTABLE TRUCK.

955,398.  Specification of Letters Patent.  Patented Apr. 19, 1910.

Application filed July 30, 1909. Serial No. 510,441.

*To all whom it may concern:*

Be it known that I, WILLIAM H. HARRIS, a citizen of the United States, residing at Gladstone, county of Union, and Territory of New Mexico, have invented certain new and useful Improvements in Portable Trucks, of which the following is a specification.

My invention relates to improvements in portable trucks especially adapted for use in conjunction with excavators, and has for its object the production of such a truck which shall be adapted to run upon the ground or upon a railroad and which shall be of simple construction and efficient in operation.

My invention consists in the combination and arrangement of parts hereinafter described and claimed.

Figure 8:
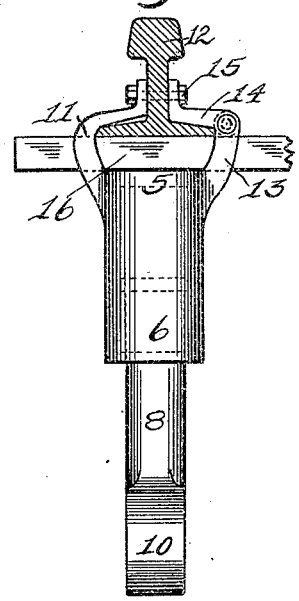
Figure 7:
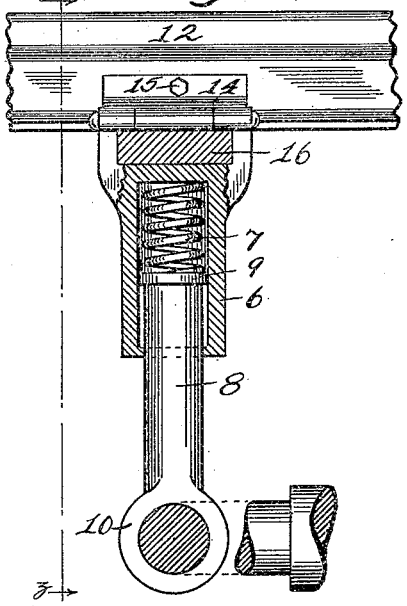
Figure 10:
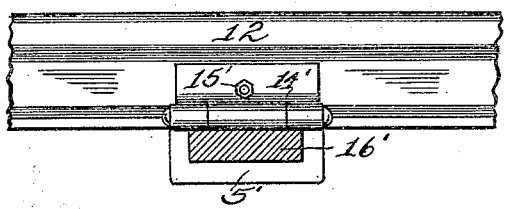
Figure 9:
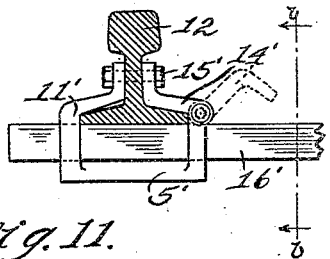
Figure 12:
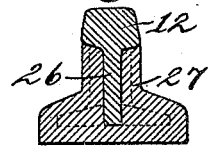
Figure 11:
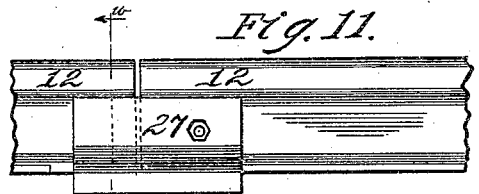
Figure 13:
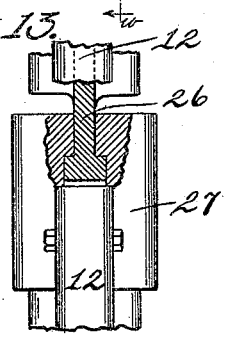

My invention will be best understood by reference to the accompanying drawings forming a part of this specification, and in which, Figure 1 is a side elevation of a portion of a series of trucks embodying my invention, Fig. 2, a top plan view of Fig. 1, Fig. 3, a side elevation illustrating an inclined approach for the trucks, Fig. 4, an enlarged section on line $x$—$x$ of Fig. 2, Fig. 5, an enlarged elevation of the joint between the track rails on two adjacent trucks, Fig. 6, a section on line $y$—$y$ of Fig. 5, Fig. 7, an enlarged sectional elevation of the standard or supporting track rail on the trucks, Fig. 8, a section on line $z$—$z$ of Fig. 7, Fig. 9, an enlarged section on line $u$—$u$ of Fig. 2, Fig. 10, a section on line $v$—$v$ of Fig. 9, Fig. 11, an enlarged elevation of the joint between the track rails on the inclined approach and track rails on a truck, Fig. 12, a section on line $w$—$w$ of Fig. 11, and Fig. 13, a top plan view, partially in section of Fig. 11.

Each truck comprises double supporting wheels consisting of inner wheels 1 and outer wheels 2, the outer wheels 2 being provided with a flange 3 on their inner edge. Wheels 1 and 2 are connected by an axle 4 thus completing a double supporting wheel. There are preferably four double supporting wheels for each truck. The outer wheels 2 and flanges 3 are so designed and spaced as to be adapted to run upon a standard gage railroad so that the trucks may be utilized for transportation over long distances on railroads. The double wheel construction is employed to obtain broad bearings to prevent sinking of the wheels in the ground when the trucks are run over the same. In so doing the flanges 3 will sink into the ground and prevent side slipping of the trucks.

Upon each of the axles 4 is mounted a supporting standard comprising a head 5 provided with a downwardly extending cylinder 6. A spring 7 is imprisoned in cylinder 6 and a piston 8 having an enlarged head 9 operates in cylinder 6 against the spring 7. At its lower end the piston 8 is provided with an eye 10 embracing axle 4. Integral with the head 5 on one side is a clamping member 11 shaped to embrace the flange and web of the track rail 12. On the other side of head 5 two lugs 13 are provided and a clamping member 14 pivoted between them. Clamping member 14 is shaped to tightly embrace the flange and web of the track rail 12 and a bolt 15 is passed through members 14 and 11 and the web of said rail to secure the parts together. Openings are provided between lugs 13 and in clamping member 11 for the reception of a cross bar 16 which extends between two opposite supporting standards. By this construction it will be seen that by means of the clamping member 14 and bolt 15 the track rail 12 and cross bar 16 may be securely fastened in position at one operation and the track rails 12 correctly positioned apart. A stiffening truss 17 is secured to the bottom of each of the rails 12 and supplemental cross bars 16′ are secured across the central portions of said rails. These supplemental cross bars 16′ are preferably secured to the rails 12 by means of clamps 5′ comprising integral clamping members 11′ and pivoted clamping members 14′ secured by a bolt 15′.

Upon one of the ends of each of the track rails 12 is secured a shoe 18 provided with a socket 19 shaped to conform to the end of the corresponding rail on the adjacent truck. Each shoe 18 is provided with lugs 20 to which are attached chains 21 also attached to similar lugs 22 on a shoe 23 secured to the end of the corresponding rail on the adjacent truck. By this construction it will be seen that when the trucks are being drawn along a railroad or over the ground the rail ends will pull out of sockets 19 and chains 21 furnish a flexible connection between adjacent trucks thus permitting the turning of curves or corners, and that when it is desired to utilize the tracks upon the trucks, the ends of the rails on one truck may be forced into the sockets on the ends of the rails of the other truck thus forming a rigidly connected track over all of the trucks.

An inclined approach is provided for an end truck. This approach comprises inclined rails 24 supported upon blocks 25. The ends of rails 24 are provided with T-shaped projections 26 and the ends of the rails 12 upon an end truck are provided with shoes 27 having sockets T-shaped in horizontal section to receive said projections 26. By this construction it will be seen that an excavating or other machine and a traction engine therefor may be run up the inclined approach into tracks 12 on the trucks and that said excavating machine and traction engine may be operated to and fro on said tracks 12 as desired.

While I have illustrated and described the preferred construction for carrying my invention into effect this is capable of modification and variation without departing from the spirit of the invention. I, therefore, do not wish to be limited to the exact details of construction set forth but wish to avail myself of such variation and modification as come within the scope of the appended claims.

Having described my invention what I claim as new and desire to secure by Letters Patent is:

1. In a device of the class described, the combination of supporting wheels each comprising an outer and an inner wheel connected by an axle, the outer of said wheels being provided with a flange on its inner edge; supporting standards mounted on said axles and track rails mounted on said supports, substantially as described.

2. In a device of the class described, the combination of two or more trucks each comprising two track rails mounted on wheels; shoes secured to the ends of the rails on one truck and provided with sockets shaped to conform to the ends of the rails on the adjacent truck; and flexible connections between said trucks, substantially as described.

3. In a device of the class described, the combination of supporting wheels; supporting standards mounted on said wheels; rail clamps on said standards each comprising a rigid member integral with said standard and shaped to embrace the flange and web of a rail on one side, a pivoted member shaped to embrace the flange and web of a rail on the other side, and means for securing said pivoted member against a rail; and two tracks rails secured in said clamps, substantially as described.

4. In a device of the class described, the combination of supporting wheels; supporting standards mounted on said wheels; rail and cross bar clamps on said standards each comprising a rigid member integral with said standard and shaped to embrace the flange and web of a rail on one side, a pivoted member shaped to embrace the flange and web of a rail on the other side, openings being provided for the insertion of a cross bar under the rail, and means for securing said pivoted member against the rail to press said rail upon the cross bar under it; cross bars secured in said openings; and two track rails secured in said clamps on said cross bars, substantially as described.

5. In a device of the class described, the combination of supporting wheels; supporting standards mounted on said wheels; two track rails mounted on said standards; shoes secured to the ends of said track rails and provided with sockets substantially T-shaped in horizontal section; and inclined approaching tracks having T-shaped projections on their ends adapted to take into said sockets, substantially as described.

In testimony whereof I have signed my name to this specification in the presence of two subscribing witnesses.

WILLIAM H. HARRIS.

Witnesses:
   HELEN F. LILLIS,
   JOSHUA R. H. POTTS.